US00RE35181E

United States Patent [19]

Hudz

[11] E Patent Number: Re. 35,181

[45] Reissued Date of Patent: Mar. 19, 1996

[54] THERMO-MAGNETIC VAPORIZER CARBURETOR

[76] Inventor: Paul H. Hudz, 3400 Inverness St., Redding, Calif. 96002

[21] Appl. No.: 356,154

[22] Filed: Dec. 15, 1994

Related U.S. Patent Documents

Reissue of:

[64] Patent No.: 5,171,487
Issued: Dec. 15, 1992
Appl. No.: 847,580
Filed: Mar. 5, 1992

[51] Int. Cl.[6] ..... F02M 15/04

[52] U.S. Cl. ..... 261/142; 261/50.1; 261/79.1; 261/DIG. 80; 123/538; 123/549; 123/557

[58] Field of Search ..... 261/142, 50.1, 261/DIG. 80, 79.1; 123/538, 549, 557

[56] References Cited

U.S. PATENT DOCUMENTS

| | | | |
|---|---|---|---|
| 1,684,480 | 9/1928 | Evans | 261/79.1 |
| 1,951,812 | 3/1934 | Smith | 261/79.1 |
| 2,197,555 | 4/1940 | Lepicard | 261/79.1 |
| 2,238,333 | 4/1941 | McCain | 261/50.1 |
| 3,498,279 | 3/1970 | Seeley, Jr. | 123/549 |
| 3,653,643 | 4/1972 | Tucker | 261/79.1 |
| 3,671,208 | 6/1972 | Medsker | 261/79.1 |
| 4,003,356 | 1/1977 | Naylor | 123/557 |
| 4,213,422 | 7/1980 | Nagel et al. | 123/549 |
| 4,213,433 | 7/1980 | Day | 123/549 |
| 4,338,907 | 7/1982 | Lindbeck | 123/557 |
| 4,398,523 | 8/1983 | Henson | 123/557 |
| 4,483,307 | 11/1984 | Gilmor | 123/558 |
| 4,622,944 | 11/1986 | Earl | 123/549 |
| 4,715,997 | 12/1987 | Boone | 261/142 |
| 4,798,191 | 1/1989 | King | 123/538 |
| 4,858,584 | 8/1989 | Bridgeman | 165/163 |
| 4,870,249 | 9/1989 | Kayanuma et al. | 219/206 |
| 4,883,616 | 11/1989 | Covey, Jr. | 261/64.4 |
| 5,063,368 | 11/1991 | Ettehadieh | 123/538 |
| 5,070,852 | 12/1991 | Po et al. | 123/538 |
| 5,080,080 | 1/1992 | Melendrez | 123/538 |
| 5,134,985 | 8/1992 | Rao | 123/538 |
| 5,159,915 | 11/1992 | Saito et al. | 123/557 |
| 5,234,170 | 8/1993 | Schirmer et al. | 123/538 |

*Primary Examiner*—Tim R. Miles
*Attorney, Agent, or Firm*—Jordan M. Meschkow; Lowell W. Gresham

[57] ABSTRACT

A thermo-magnetic vaporizer carburetor comprised of a vaporization reaction chamber which includes South pole exposed magnetic means uniformly around the chamber. The South pole magnetic field alters the molecular structure of the fuel so that it is more rapidly dispersed in the fuel/air mixture entering the I.C. engine. The liquid fuel enters the thermo-magnetic vaporizer under high pressure at ambient temperature and is conducted into a circular spiral arrangement of tubing of approximately six turns where the change-of-state transition is made from a liquid fuel to a fuel vapor. The circular spiral tubing assembly of the vaporization reaction chamber is the conduit for the fuel, as well as an electrical heating element that vaporizes the fuel that is flowing through it. The vaporized fuel exits vaporization reaction chamber and is directed to the exit port of the central vane gimbal where it is injected into the low pressure point of the spinning intake air vortex. The fuel vapor is then evenly dispersed throughout the intake air by the natural vortex which is created by the top plate vortex guide vanes and the three vane throttle mechanism, before entering the intake manifold of the I.C. engine.

11 Claims, 5 Drawing Sheets

THERMO-MAGNETIC VAPORIZER CARBURETOR

Matter enclosed in heavy brackets [ ] appears in the original patent but forms no part of this reissue specification; matter printed in italics indicates the additions made by reissue.

PRIOR HISTORY

Contrary to popular belief, liquid gasoline does not explode. When gasoline is mixed with air in the proper proportion and ignited, the gasoline vapor explosion is much more powerful than an equal weight of dynamite. The conventional carburetor is designed to mix liquid fuel with enough air to form an explosive mixture. An ideal carburetor should be so constructed that it will vaporize every drop of gasoline and mix it thoroughly with enough air to burn every molecule of the vapor completely.

The perfect carburetor is difficult to build because:

1. Gasoline has a varying composition of octanes.

2. In conventional carburetors, perfect vaporization cannot be secured even when the engine is warmed up.

3. A carburetor that is adjusted for one speed of operation is not perfectly adjusted when the engine is running more rapidly.

GENERAL DESCRIPTION OF PRESENT DAY CARBURETORS

Modern engines use carburetors with a venturi or variations of throttle body injection of fuel. One part of the carburetor consists of a gasoline well, which is kept filled to a certain level by means of a float which controls a needle valve at the end of the tube leading from the gas supply tank. When the engine operates, a partial vacuum is produced in the intake manifold chamber.

Air enters the carburetor when the throttle is opened. As the air advances further, the carburetor throat narrows to a small size, then widens out again. Its shape is called a venturi. The venturi increases the velocity of the air rushing through the carburetor and lowers its pressure (Bernoulli's Principle). The higher pressure in the float chamber forces gasoline through the nozzle into the venturi.

The intake air picks up the tiny droplets of gasoline and turns it into a mixture of vapor and tiny droplets of gasoline. In most of the currently serviceable carburetors, the principal portion of fuel passing through the carburetor is in liquid state. An auxiliary valve may be used to open automatically and admit more air when the engine is running rapidly.

It is economical to have the carburetor so adjusted that the engine will run on the "leanest" possible mixture. This type of mixture causes an engine to stall and is hard to start in cold weather. The choke should be used when starting the engine in order to shut off some of the air supply entering the carburetor and to give a richer mixture. Next, the choke button should be pushed back again to admit free entrance of air as soon as the engine is warmed up. In modem cars, the choke is automatically operated.

All factory throttle body fuel injection systems spray gasoline into an air strum for a misting effect. This breaks the fuel particles into smaller units, thus increasing fuel surface area to oxygen. Evaporation rate is proportional to surface area, i.e., the smaller the fuel particles, the greater the surface area and vapor volume. The present state of the art throttle valves are also not efficient in the dispersion of the fuel evenly throughout the fuel air charge of the engine. The resulting fuel air charge is not very efficient.

BACKGROUND OF THE INVENTION

The beneficial effects of exposing fuels to North or South unipolar magnetic field energies are observable with organic as well as inorganic fuels. The South pole exposed fuels are highly sensitive to environmental conditions and react more rapidly on exposure to heat, as in a vaporization reaction chamber or combustion chamber. It has been observed that South pole exposed fuels burn more efficiently and provide an improved explosion result when employed as a fuel in an internal combustion engine.

The principle of fuel vaporization is well understood in automotive carburetor art, where the fuel particles are finely broken down to provide greater oxidation and thus achieve more complete combustion of the fuel/air mixture within the engine cylinders. cylinders.

A major problem with present automotive carburetors is that the fuel particles are not broken down finely enough, and thus a considerable portion of the air/fuel intake is not vaporized and does not completely burn within the engine cylinders.

Many types of vaporizing carburetors have been proposed and are in the prior art, but most of these are too bulky and impractical due to the large surface area required to convert the liquid fuel into a fully vaporized state. Various other types of vaporizing carburetor arrangements are more compact but have significant shortcomings, and do not fully meet the requirements for a practical and cost-effective vaporization carburetor.

An ideal automotive carburetor would be one in which the fuel is completely vaporized, i.e.: in a complete gaseous state with no liquid fuel droplets present, prior to entering the intake manifold on the I.C. engine. The most successful of the prior known vaporizing carburetors was introduced by Charles Pogue in the 1930's, but as previously described this carburetor was very large and basically impractical. The Pogue carburetor did provide a high rate of vaporized fuel to the engine, and it was claimed to provide up to 200 miles-per-gallon of gasoline. This very large carburetor was never widely accepted due to its large size and complexity, along with its high cost.

A significant problem presented by some past vaporizing carburetors is low efficiency because of the high heating temperatures and heat loss in the heat exchange process, which in some cases approaches the flash point of the fuel used in the I.C. automotive engine.

Most of the vaporizing carburetors disclosed in the prior art utilize electrical heating elements, since this method is the most practical way to heat the circulating liquid fuel to increase heating effectiveness and provide a quick and safe heating mode. Since the heat requirement level can be precisely controlled by the electrical wattage flow to the resistance heating elements, electrical heating for fuel vaporization is the preferred and most practical method to utilize for these vaporizing carburetors.

The heating of the carburetor fuel would be started when the vehicle ignition is turned on, and the time delay involved in getting the fuel to the vaporization stage is not considered to be a drawback for these high efficiency carburetors.

Another type of known and established method of improving fuel economy in gasoline-powered vehicles is the use of permanent magnets secured to the fuel intake tubing lines adjacent to existing vehicle carburetors. The specific application of South magnetic pole magnets toward flowing fuel has been shown to be beneficial to improving gasoline mileage-economy, and is now used in most of the present after-market magnetic fuel-saving devices.

The basic reason why the South magnetic pole is useful in these magnetic devices is that the magnetic flux pattern from the South magnetic pole is divergent, while the north magnetic pole is convergent, which has been clearly shown in cathode ray tube exposure tests. When opposite South pole permanent magnets are placed on either side of the fuel tubing lines the South divergent flux pattern has an intense effect on the fuel flow, and tends to rapidly separate the minute fuel particles, which is most desirable in achieving more complete fuel combustion within an I.C. engine.

Without such rapid divergence and separation of the minute fuel droplets, the fuel flow tends to enter the engine's intake manifold in "clots", and thus incomplete combustion of the fuel is evident.

It is important that the South magnetic poles be placed in close proximity to the fuel lines, and that they be arrayed as closely as possible to the entrance of the vaporized fuel as it enters the intake air vortex.

Most of the magnetic fuel-saving devices now on the aftermarket utilize South pole ferrite permanent magnets, but these will not be nearly as effective as the South magnetic pole magnetic flux that is available in this present invention.

DISCLOSURE OF THE INVENTION

The thermo-magnetic vaporizer carburetor is a combination of two known, and proven carburetion improvement methods, in one composite carburetor arrangement. The resulting combination of these two past proven carburetion methods produces a major improved carburetor which is greatly superior to all of the past single-mode vaporizer carburetor units. The major component of this carburetor is the vaporization reaction chamber's multi-coil tubing into which the liquid fuel flows.

The liquid fuel under high pressure at ambient temperature enters the mixture intensity metering valve which regulates the intensity (volume) of the liquid fuel flow. The liquid fuel then enters the circular, multi-coil tubing. This circular, multi-coil tubing is the electrical resistance heating element. When a current is applied to it by the microcontroller, the heat thus generated causes the liquid fuel to completely vaporize as it passes through the vaporization reaction chamber.

The vaporized fuel exits the vaporization reaction chamber and is directed into the low pressure point of the intake air vortex, and is evenly dispersed throughout the intake air. This intake air vortex is generated as the air passes through the top plate vortex guide vanes and then is speeded up by the triple vane throttle mechanism within the carburetor body.

It is known and established in the art that the South magnetic pole causes a dispersion of liquid fuel molecules which leads to more complete combustion of the vaporized fuel within the combustion cylinders of I.C. engine.

The second fuel mileage enhancement method is provided by the uniform exposure of the liquid/gaseous fuel to a substantial South magnetic field throughout the vaporization chamber and carburetor body. The South magnetic polarity, is provided by the electromagnetic field created by the current which flows through the multi-coil tubing. An optional permanent ring magnet may be placed in close proximity to the circular body of the thermomagnetic reaction chamber to enhance the magnetic field.

While the South magnetic polarity may be provided around the entire circular, multi-coil fuel tubing, it is most important that an intense South magnetic polarity be applied at the exit of the vaporized fuel, as it enters into the intake air flow vortex.

When permanent magnets are used in these dual-mode carburetors they must be protected by insulation from the heat, so that they are not degraded and permanently damaged.

The combination of the heat application to the fuel in the circular, multi-turn-coil tubing and the simultaneous exposure to the South magnetic polarity causes an acceleration in the vaporization and molecular dispersion processes which produces far more complete and uniform vaporization of the fuel as it enters the intake air vortex of this type of dual-mode carburetor.

While this type of dual-mode carburetor may have a different configuration than conventional automotive carburetors, it can be practically incorporated within the engine compartment of all types of gas powered vehicles.

There is considerable flexibility in the arrangement of this dual-mode carburetor, with the configuration vaporization reaction chamber generally similar to conventional air filter canisters on vehicles.

It is feasible that a conventional air filter component can be directly mounted on the top of a similar sized vaporization reaction chamber, with modifications made in the various connections i.e.; fuel and control lines, to the dual-mode carburetor to accommodate the various components.

While the first cost of such dual-mode carburetors will be somewhat higher than present carburetors, the improved fuel economy performance will rapidly amortize the initial cost of the unit.

The fact that the relative placement of the components such as the vaporization reaction chamber and the fuel intensity metering valve is flexible, as allowed by flexible tubing connections, means that all of the principle components can be conveniently clustered near and around the air intake manifold mounting pad of the engine.

The long term reliability of this dual-mode carburetor is assured since the principle of operation and the functioning components are basically simple. These new type carburetors provide for better dependability than present carburetors, since they do not utilize float chambers and metering valves which are prone to flooding and malfunctioning.

The electrical operating costs for the multi-turn-coil tubing which serves as a resistance heater and electromagnet are minimal due to their modest wattage levels and compactness. The total electrical draw is readily and automatically compensated by the charging of the vehicle's onboard battery and the charging alternator.

All of the dual-mode carburetor components are constructed from high quality materials, as in present carburetor art, with the wide use of noncorrodible metals such as Hastloy C276 for the fuel tubing and other suitable non-rusting metals. The carburetor casting is constructed of non-magnetic materials.

By its principle and construction this dual-mode carburetor is considerably more rugged and less susceptible to malfunctioning than conventional carburetors, since it employs direct and continuous fuel introduction into the vaporization reaction chamber of the unit/assembly.

The use of the word "fuel" as used in this description is intended to include gasoline, propane, butane, alcohol, methanol, and any other suitable volatile liquid or gaseous hydrocarbon fuel used to operate internal combustion engines of all types.

The use of the term "internal combustion engine" is intended to include all types of open cycle reciprocating piston engines, turbine and rotary engines.

Various features and advantages of this present invention will become apparent from the itemized description which follows, when taken in conjunction with the accompanying drawings:

REFERENCE NUMERALS IN DRAWINGS

Figure 1:
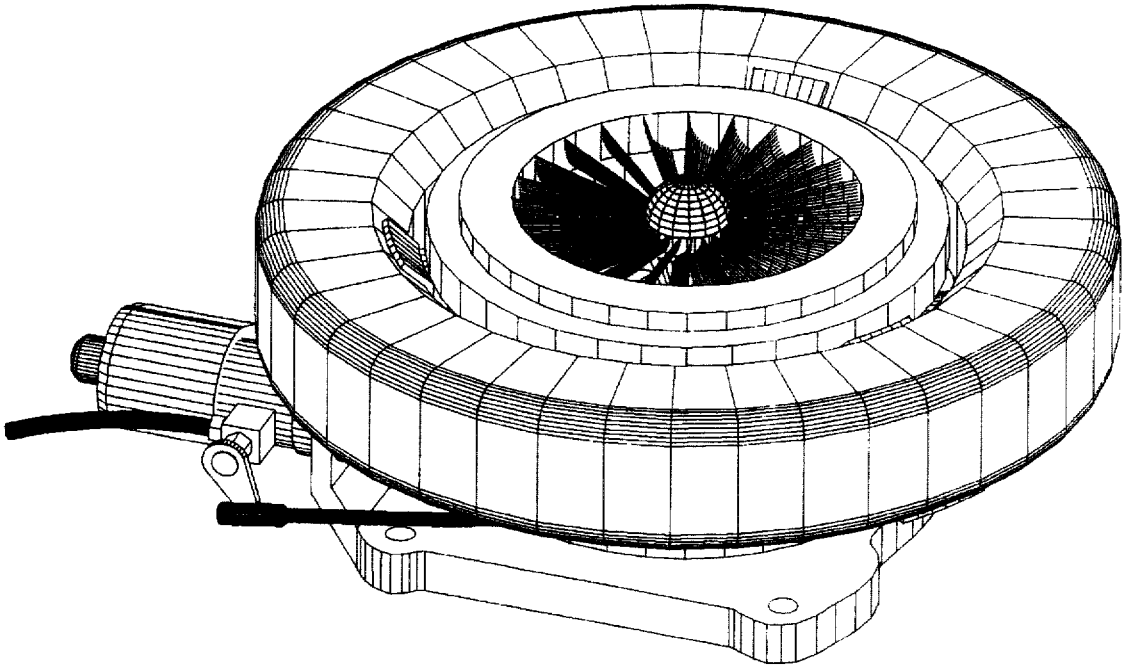
FIG. 1 is a perspective view.
Figure 2:
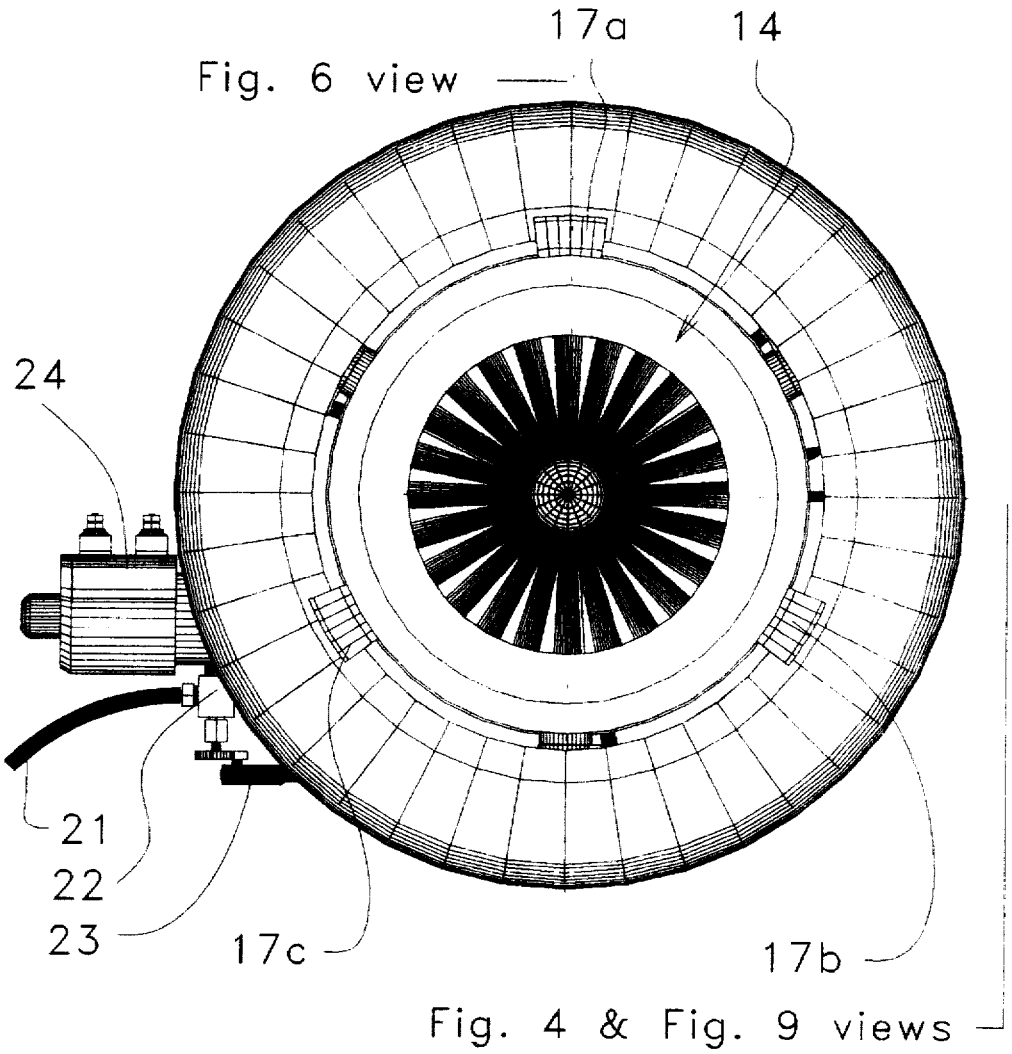
FIG. 2 is a top view.
Figure 3:
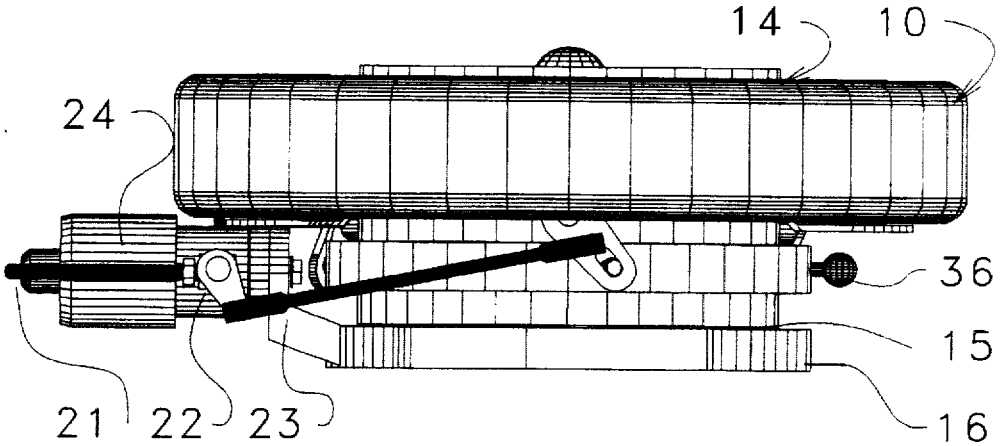
FIG. 3 is a side elevation view.
Figure 4:
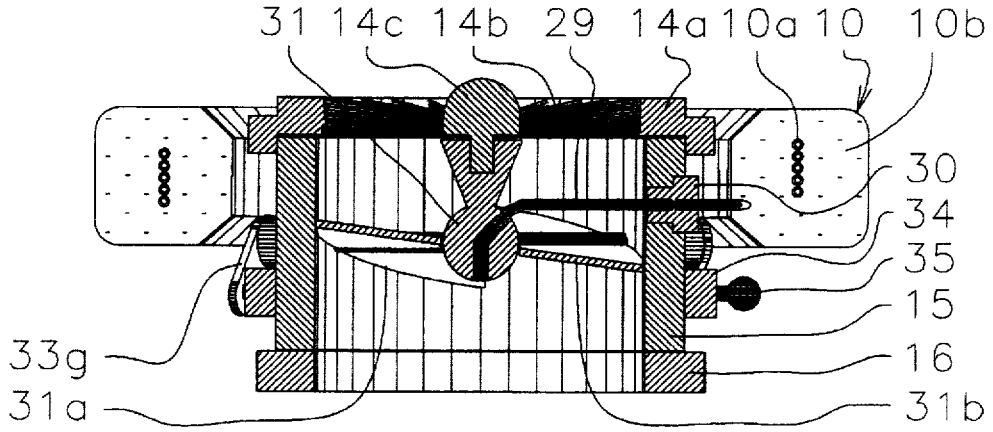
FIG. 4 is cross-section, elevation view from the front.
Figure 5:
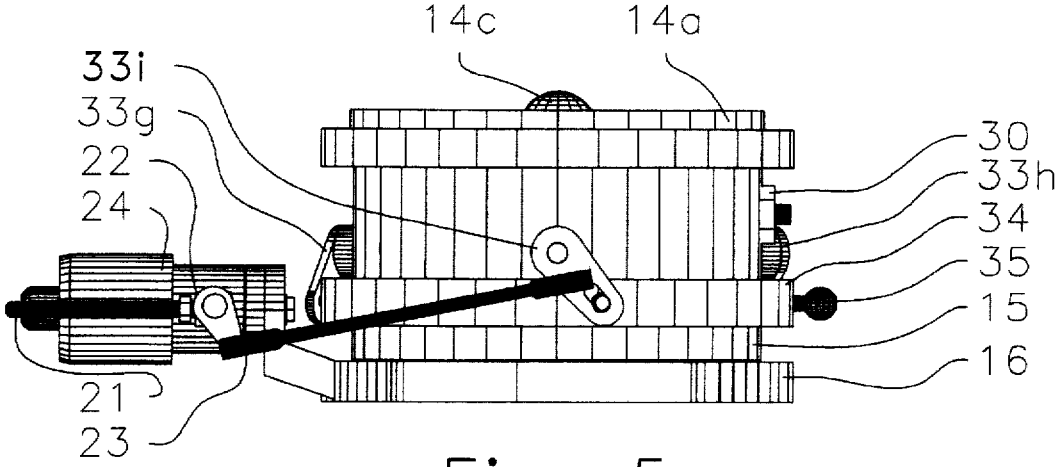
FIG. 5 is a front elevation view with the thermo-magnetic chamber removed showing both the throttle vane mechanism and the fuel intensity metering control mechanism.
Figure 6:
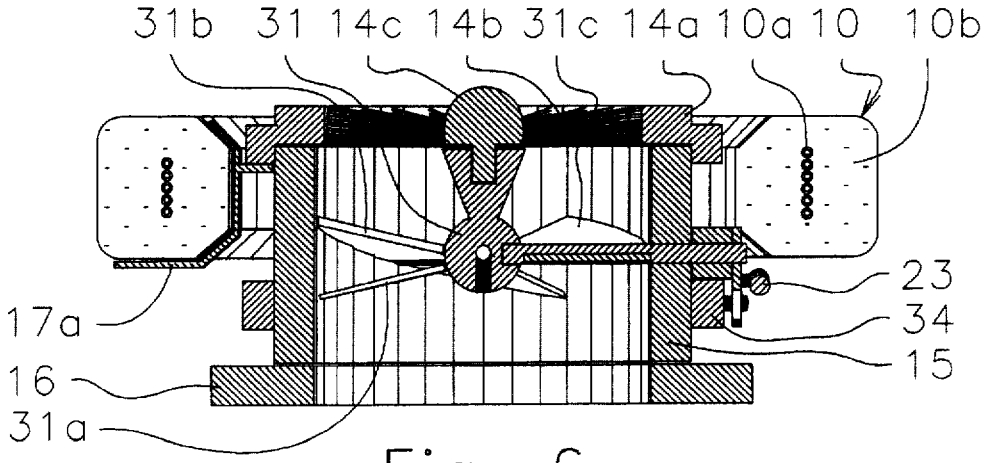
FIG. 6 is cross-section side elevation as viewed from the left side.
Figure 7:
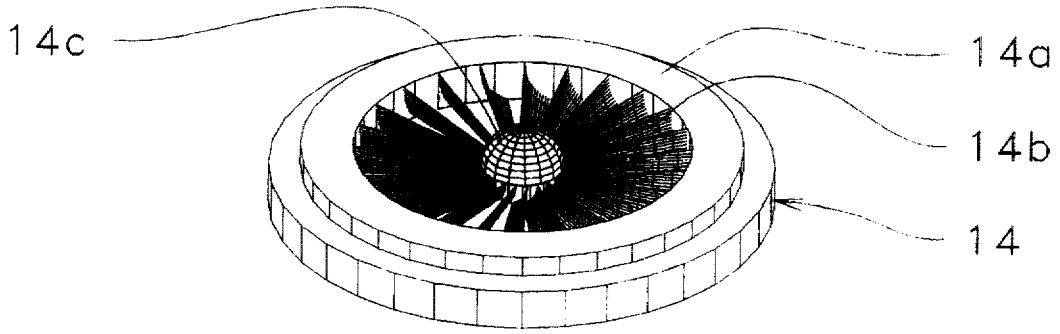
FIG. 7 is a perspective view of top plate vortex guide vanes.
Figure 8:
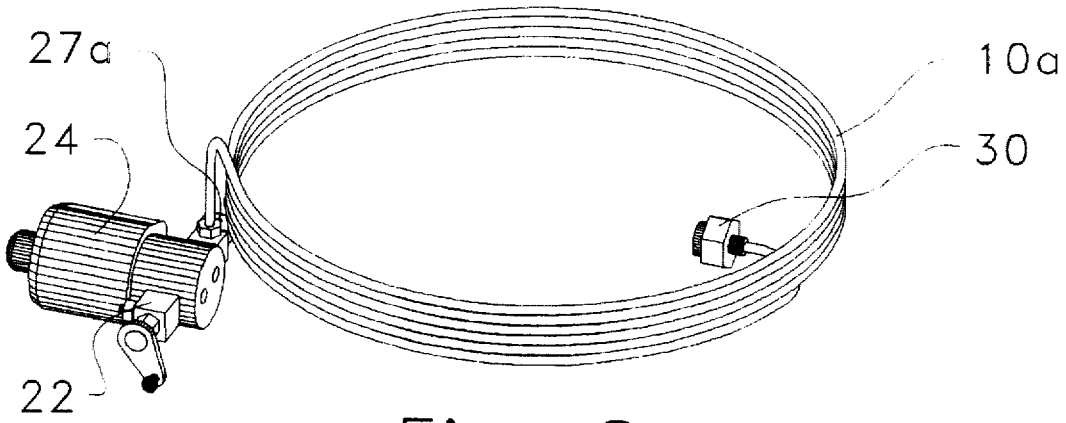
FIG. 8 is perspective view of the fuel system with the spiral tubing removed from the thermo-magnetic chamber.
Figure 9:
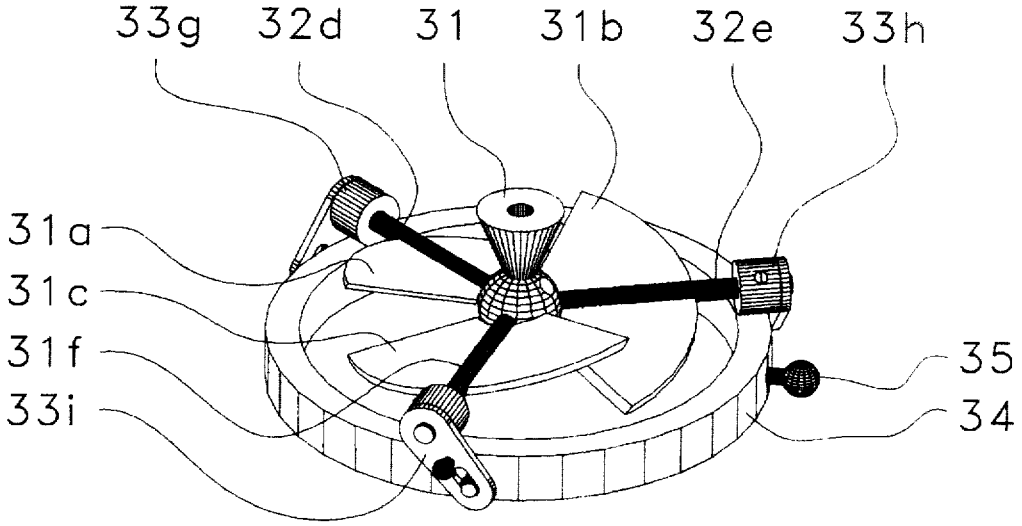
FIG. 9 is a perspective view of the throttle vane mechanism.

10. Thermo Magnetic Chamber Assembly.
10a. Multi-turn-Coil.
10b. High temperature ceramic insulation.
14. Carburetor top plate assembly.
14a. Top plate ring.
14b. Carburetor vortex guide vanes.
14c. Air filter canister mounting.
15. Carburetor body casting.
16. Carburetor bottom plate.
17a. Thermo magnetic chamber support bracket.
17b. Thermo magnetic chamber support bracket.
17c. Thermo magnetic chamber support bracket.
18. Fuel supply line to fuel pump.
19. High pressure fuel pump.
20. Fuel pressure regulator.
21. High pressure fuel line.
22. Fuel intensity metering valve.
23. Fuel intensity metering control rod.
24. Fuel shut off solenoid.
25. Fuel shut off control cable.
26. Carburetor micro-controller.
27. Thermo-magnetic-chamber control cable.
27a. Thermo-Magnetic Chamber terminal connection.
28. Permanent ring magnet(optional).
29. Fuel vapor injector tube.
30. Fuel vapor injector fitting.
31. Vane gimbal.
31a. Vane 1.
31b. Vane 2.
31c. Vane 3.
32d. Vane 1 control shaft.
32e. Vane 2 control shaft.
32f. Vane 3 control shaft.
33g. Vane 1 throttle control arm.
33h. Vane 2 throttle control arm.
33i. Vane 3 throttle control arm.
34. Throttle co-ordinator ring.
35. Throttle to throttle ring coupler.

PREFERRED EMBODIMENT

The fuel enters the high pressure fuel pump (19), exits under high pressure to the pressure regulator (20) where the pressure is regulated. The high pressure fuel enters the intensity metering valve (22) where the intensity of the fuel is regulated. Then the fuel passes through the electric fuel shut off solenoid (24) into the vapor reaction chamber (10).

Figure 10:
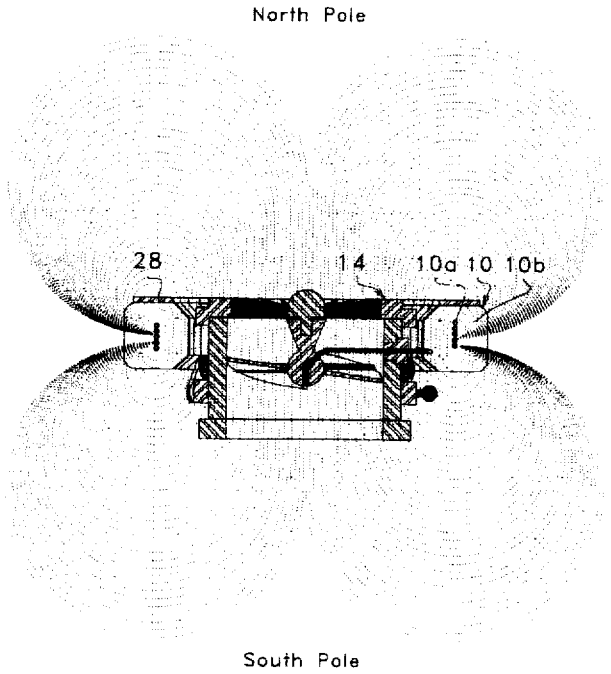
FIG. 10 is a cross-section elevation view from the front of thermo-magnetic vaporizer carburetor showing the magnetic flux map.
Figure 11:
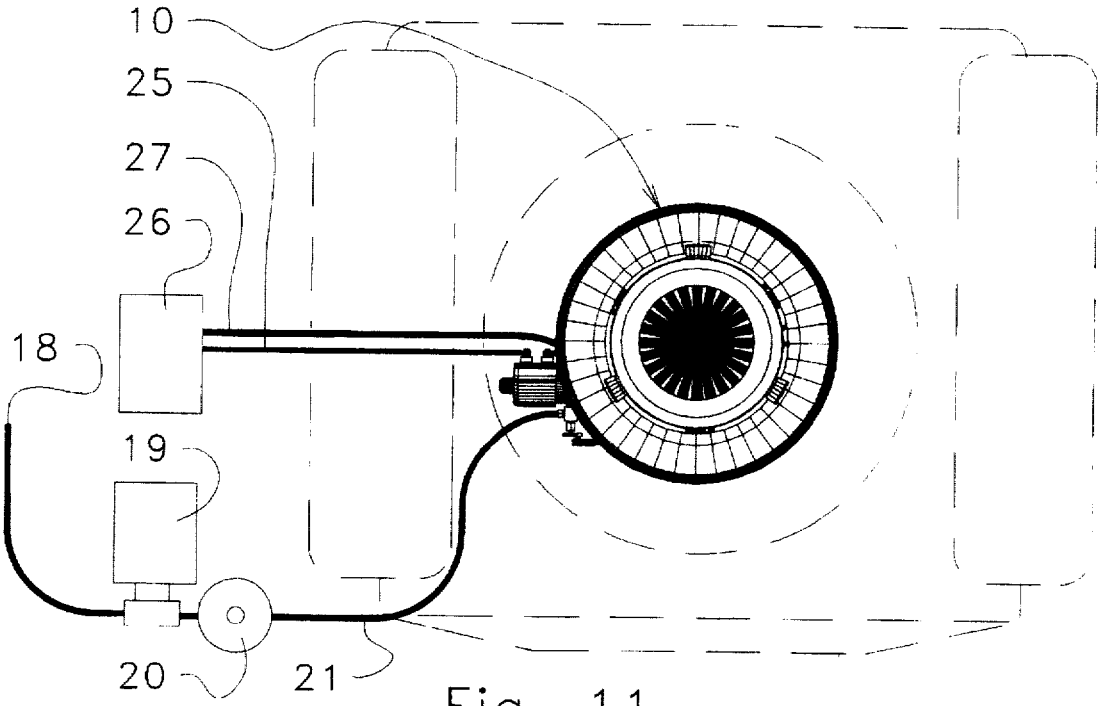
FIG. 11 is a full top view of the complete thermo-magnetic vaporizer carburetor system.

The vaporization is accomplished in an explosion-proof vaporization reaction chamber assembly (10) which has a strong magnetic field (FIG. 10). This magnetic field (FIG. 10) alters the molecular structure of the fuel so that it is more readily dispersed in the fuel air charge of the engine. The fuel exits the vaporization reaction chamber assembly (10), passes through the vapor injection tube (29) into the vane gimbal (31) where it is injected into the low pressure point of the intake air vortex. This fuel vapor is then dispersed evenly throughout the fuel air charge by the spinning vortex created by the vortex guide vanes (14b) and the three vane throttle mechanism (31a), (31b), (31c), (32d), (32e), (32f), (33g), (33h), (33i), (34), & (35) before entering the intake manifold.

The walls of the vaporization reaction chamber multi-turn-coil tubing (10a) provide a low resistance heating element, a containment for the fuel during the transition from liquid to vapor, and a conductor for an electro magnet. The fuel under high pressure at ambient temperature enters the vaporization reaction chamber multi-turn-coil tubing (10a), where it is heated in a partial vacuum to its vaporization temperature under computer control (26). The strong magnetic field (FIG. 10) alters the molecules of fuel for increased dispersion of the vapor upon exiting the vaporization reaction chamber. The engine intake partial vacuum, plus the low pressure at the center of the spinning air vortex generated by the vortex guide vanes and the triple throttle vanes (31a), (31b), (31c), (32d), (32e), (32f) & (33g) aid in the complete vaporization of the fuel.

In summary, this vaporization reaction chamber assembly (10) offers a unique method of vaporization and altering the molecular structure of the fuel vapor before its dispersion while offering no opportunity for explosion.

It may be briefly stated that the vortex guide vanes (14b) and the triple vane throttle (31a), (31b), (31c), (32d), (32e), (32f), & (33g) direct the intake air flow into a natural spinning vortex that facilitates a complete mixing of the vapor fuel air charge entering the engine. The spinning vortex now containing vapor fuel and air is further mixed as it reaches the intake manifold and creates a tremendous turbulence.

DESCRIPTION OF THE PREFERRED EMBODIMENT

Referring in detail to the accompanying drawings, the fuel flow is brought into the fuel line (18), which is connected to the fuel pump (19), and the adjacent pressure regulator (20), which controls the pressure level of the fuel entering into the carburetor. Fuel tubing (21), connects the pressure regulator (20), with the mixture intensity metering valve (22), which controls the intensity or fuel flow volume that goes into the carburetor. The fuel flow then passes through the electric fuel shutoff solenoid (24), which provides a positive shutting off means for the carburetor. The liquid fuel flow from the output side of the electric fuel shut-off solenoid (24), is connected and sealed into the Intake portion of the vaporization reaction multi-turn-coil tubing (11).

The major functioning component within the vaporizer reaction chamber, is the vaporization multi-turn-coil tubing (10a), which is the change-of-state component for the thermo-magnetic vaporizer carburetor. The multi-turn-coil tubing (10a), is made from C276 alloy (or other appropriate alloys) and is formed into a circular spiral of appropriate diameter. The multi-turn-coil tubing may be made with single or multiple uniform channels throughout its length. The multi-turn-coil tubing is surrounded by high temperature ceramic fiber insulation that is made in several sections for convenience in assembly. The multi-turn-coil tubing (10a), is completely enclosed by and concentrically supported by molded high temperature ceramic fiber insulation material (10b), within the vaporizer reaction chamber assembly (10). The high temperature ceramic fiber insulation material (10b) retains heat within the housing component and keeps the outer surfaces of the housing at ambient temperature.

The vaporizer reaction chamber assembly (10), is mounted to, and supported by the carburetor top plate ring (14a). The top plate ring (14a), is provided with a mounting means (14c), for securing and sealing a standard air filter canister.

Multiple support brackets (17a), (17b) & (17c) secure the vaporizer reaction chamber assembly (10) to both the top plate ring (14a) and the vaporizer reaction chamber assembly (10).

The vaporizer reaction chamber assembly (10) and the carburetor body are exposed to a strong South pole magnetic field (FIG. 10) created by the current flowing through the multi-turn-coil tubing (10a). The current flowing through the multi-turn-coil tubing (10a) has a two fold purpose: to heat the circulating fuel and to provide a South Pole magnetic field (FIG. 10), for the thermo-magnetic vaporizer and the carburetor assembly before the vaporized fuel is dispersed.

A micro-controller unit (26), connecting wiring (27), connects to the input terminal (27a). The input end of the multi-turn-coil tubing (10a) is connected to the fuel solenoid (22) and input terminal (27a). The multi-turn-coil tubing receives current from the vehicle electrical battery, by this circuit. The electrical wattage required, at twelve volts D.C. is not large since the multi-turn-coil tubing serves as an efficient electrical resistance heater and electromagnet. The full wattage requirements for the electrical system are well within the range of the vehicles electrical system.

The shaped outlet portion of the vaporization multi-turn-coil tubing (10a), is connected to the vapor injector tube (29), through the tube fitting (30), which is threaded in to the side of the carburetor body casting (15). The outlet end of the vapor injection tube (29), is directed into the vane gimbal (31), where the vaporized and dispersed fuel molecules are injected into the low pressure point of the spinning intake air vortex.

The fuel vapor is then evenly dispersed throughout the fuel/air mixture by the vortex forming vortex guide vanes (14b) and the three-vane throttle mechanism assembly (31 a,b,c and 32 d,e, & f). The three vane throttle mechanism assembly (31 a,b,c and 32 d,e, & f), is comprised of three 120 degree sector-shaped throttle vanes which co-act and control the air/vapor flow into the engines intake manifold. The vortex guide vanes (14b) and the three throttle vanes (31 a,b and c), direct the intake air and fuel vapor flow into a natural spinning vortex that facilitates the complete mixing of the vapor/air mixture entering the engine.

The spinning intake air vortex contains the fuel/air volume and is further mixed as it reaches the engine intake manifold which creates an massive turbulence as the mixture enters the intake manifold.

A mixture intensity control rod (23), connects the mixture intensity metering valve (22), with the throttle control arm (33f), which is controlled by the relative position of the three throttle vanes (31 a,b, and c, and shafts 32 d,e and f) and the throttle ring co-ordinator (34).

The temperature of the vaporization multi-turn-coil tubing (10a), is controlled by an on-board miniature computer unit (26), located within the engine compartment of the vehicle.

The heating of the circulating fuel within the vaporization multi-turn-coil tubing (10a), is done in a partial vacuum to its vaporization temperature, as controlled by the miniature micro-controller unit (26).

FIG. 10, of the drawings shows an alternate arrangement for the South magnetic polarity field within the vaporizer reaction chamber assembly (10), including the addition of optional permanent ring magnet (28).

The South magnetic pole face of this permanent ring magnet (28), must face toward the vaporization, multi-turn-coil tubing (1Oa), and is protected by thermal insulation (10b), from the high temperature within the vaporizer reaction chamber assembly (10).

The invention has been described in detail with particular reference to a preferred embodiment thereof, but it will be understood that variations and modifications can be effected within the spirit and scope of this invention.

What is claimed is:

1. A carburetor comprising dual means for heating/vaporization and magnetic dispersion of the liquid fuel for [all types of] internal combustion engines[;] *comprising:* a thermo-magnetic vaporizer chamber [in a circular ring form] with [multiple turns of] tubing *means* through which the fuel passes;

[a] fuel supply means [of a fuel pump, pressure regulator and fuel mixture intensity metering valve along with an electric fuel shut-off solenoid suitably connected] to provide a high pressure fuel source;

a carburetor body casting which provides vaporized and dispersed fuel entrance into the engine intake manifold;

[said carburetor body casting supports] a vortex forming carburetor top plate and said thermo-magnetic vaporizer chamber [by means of multiple shaped metal supports] *supported by said carburetor body casting*;

[said carburetor top plate to which] a central vane gimbal [is] affixed [at the center line of the carburetor body casting] *to said carburetor top plate*;

said central vane gimbal [which supports] *supporting at least* three [or more identical] throttle control vane shafts within said body casting;

said throttle control vane shafts supporting *at least* three [or more identical shaped] throttle vanes;

a throttle control means for positioning said [three or more identical shaped] throttle vanes, one of which is also connected to a mixture intensity metering valve;

[a multi-turn-coil tubing which serves as an electrical resistance] *a fuel* heater, [a coil of] *and* an electromagnet [and a conduit for the fuel] *mounted on said casting*;

a electrical source and control means for energizing and controlling said [multi-turn-coil tubing within said thermo-magnet vaporizer chamber] *heater*;

a vapor injection tube secured [within the side of] *in* said carburetor casting with connection to the exit end of said [multi-turn-coil] tubing *means*;

said vapor injection tube *having* the exit end [is affixed and] connected [into] *to* the central vane gimbal; *and* a central vane gimbal exit port [at the bottom center line of central vane gimbal].

[2. The thermo-magnetic vaporizing carburetor of claim 1, in which said electrical resistance tubing coils are uniformly located within said thermo-magnetic vaporizer chamber;

a thermal, electrical insulation and support means for said electrical resistance tubing coils within said thermo-magnetic vaporizer chamber;

a control means for the current supplied to said electrical resistance tubing coils.]

3. The [thermo-magnetic vaporizing] carburetor of claim 1 [where in] *wherein* said [multi-turn-coil] tubing *means comprises multiple turns of tubing and comprises a coil, which* serves as a resistance heater and coil of [an] *said* electromagnet.

4. The thermo-magnetic vaporizing carburetor of claim 1, in which the South magnetic pole (FIG. 10) faces the [multi-turn-coil fuel] tubing *means*.

5. The thermo-magnetic vaporizing carburetor of claim 1, in which said [multi-turn-coil] tubing *means* is supplemented with a permanent ring magnet;

said permanent ring magnet is affixed on top of the thermomagnetic vaporizer chamber with South pole facing the [internal multi-turn-coil tubing] *inside of said casting*.

[6. The thermo-magnetic vaporizer carburetor of claim 1, in with said control means for energizing multi-turn-coil tubing for precise temperature control;

a thermo-couple thermally affixed to and electrically insulted from the multi-turn tubing is connected to a microcontroller by appropriate cable, the controller thereby senses the temperature of the multi-turn-coil tubing;

a optional means of sensing temperature by said multi-turn tubing's change in resistance;

said micro-controller controls the electrical current to the multi-turn-coil tubing according to its temperature;

a electrical resistance element in some other form than the electrical multi-turn-coil tubing.]

7. The thermo-magnetic vaporizer carburetor of claim 1, wherein the top plate is provided with suitable mounting and sealing means for the mounting of a standard automotive air filter canister and air filter component[;

a top plate with vortex initiating vane guides molded into it's structure].

[8. The thermo-magnetic vaporizer carburetor of claim 1, in which fuel shut-off solenoid and adjacent mixture intensity metering valve are provided with metallic support means from said carburetor body casting;

said fuel shut-off solenoid is located alongside said mixture intensity metering valve;

a throttle co-ordinator means which operates the three or more vane shafts in concert;

a throttle control arm mounted on each throttle control shaft and connected to the throttle control means;

a control ball coupling mounted on one of said throttle control arms;

a connection of said control means in a rod form to said mixture intensity metering valve.]

[9. The thermo-magnetic vaporizing carburetor of claim 1, in which said fuel pump and pressure regulator are adjacent to each other within the incoming fuel tubing line;

said fuel pump and pressure regulator are provided with metallic support means within the engine compartment of the vehicle.]

[10. The thermo-magnetic vaporizer carburetor of claim 1, wherein said fuel pump and adjacent pressure regulator may be remotely mounted away from said thermo-magnetic vaporizer carburetor;

a connecting means between said fuel pump and adjacent pressure regulator and said mixture intensity metering valve that is affixed to and connected to the electric fuel solenoid located adjacent to the thermo-magnetic vaporizer carburetor.]

*11. The carburetor of claim 3 in which said resistance tubing coils are uniformly located within said thermo-magnetic vaporizer chamber;*

*a thermal, electrical insulation and support means for said resistance tubing coils within said thermo-magnetic vaporizer chamber;*

*a control means for the current supplied to said resistance tubing coils.*

*12. The thermo-magnetic vaporizer carburetor of claim 11, in which said control means for energizing said tubing means provides precise temperature control, further comprising:*

*a thermo-couple thermally affixed to and electrically insulated from the tubing means is connected to a microcontroller, the controller thereby senses the temperature of the tubing means;*

*a optional means of sensing temperature by a change in resistance of said tubing means; and*

*said micro-controller controls the electrical current to the tubing means according to its temperature.*

*13. The carburetor of claim 11 wherein:*

*said fuel supply means comprises fuel pump means, pressure regulator means, fuel mixture intensity metering valve means, and fuel shut-off means,*

*said carburetor body casting comprises multiple shaped metal supports for supporting said carburetor top plate and said thermo-magnetic chamber;*

*said central vane gimbal is affixed to said carburetor top plate at the center line of said carburetor casting; and*

*said central vane gimbal exit port is at the bottom center line of said central vane gimbal.*

*14. The thermo-magnetic vaporizer carburetor of claim 13 in which fuel shut-off means and adjacent mixture intensity metering valve are provided with metallic support means from said carburetor body casting;*

*said fuel shut-off means is located alongside said mixture intensity metering valve;*

*a throttle co-ordinator means which operates the three or more vane shafts in concert;*

*a throttle control arm mounted on each throttle control shaft and connected to the throttle control means;*

*a control ball coupling mounted on one of said throttle control arms;*

*a connection of said control means in a rod form to said mixture intensity metering valve.*

*15. The thermo-magnetic vaporizing carburetor of claim 13, in which said fuel pump and pressure regulator are adjacent to each other within the incoming fuel tubing line;*

*said fuel pump and pressure regulator are provided with metallic support means within the engine compartment of the vehicle.*

*16. The thermo-magnetic vaporizer carburetor of claim 13, wherein said fuel pump and adjacent pressure regulator may be remotely mounted away from said thermo-magnetic vaporizer carburetor;*

*a connecting means between said fuel pump and adjacent pressure regulator and said mixture intensity metering valve that is affixed to and connected to the electric fuel means located adjacent to the thermo-magnetic vaporizer carburetor.*

* * * * *